(12) United States Patent
Shusterman

(10) Patent No.: US 9,736,728 B1
(45) Date of Patent: Aug. 15, 2017

(54) IDENTIFYING AVAILABLE PACKET DATA NETWORK GATEWAYS BASED ON RESPONSE MESSAGES

(71) Applicant: Sprint Communications Company L.P., Overland Park, KS (US)

(72) Inventor: Alex Shusterman, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 65 days.

(21) Appl. No.: 14/570,011

(22) Filed: Dec. 15, 2014

(51) Int. Cl.
| | |
|---|---|
| H04L 12/56 | (2006.01) |
| H04W 28/02 | (2009.01) |
| H04L 12/66 | (2006.01) |
| H04W 28/08 | (2009.01) |
| H04W 72/04 | (2009.01) |
| H04W 88/16 | (2009.01) |

(52) U.S. Cl.
CPC ..... *H04W 28/085* (2013.01); *H04W 72/0486* (2013.01); *H04W 88/16* (2013.01)

(58) Field of Classification Search
CPC ...... H04L 12/66; H04L 12/56; H04W 28/085; H04W 72/0486; H04W 40/02; H04W 48/17; H04W 88/16; H04W 36/12; H04W 76/045
USPC ....................................................... 370/236
See application file for complete search history.

(56) References Cited

U.S. PATENT DOCUMENTS

| | | | |
|---|---|---|---|
| 8,086,724 B2 | 12/2011 | Juhasz et al. | |
| 2010/0281157 A1* | 11/2010 | Ramankutty | H04W 24/08 |
| | | | 709/224 |
| 2011/0075557 A1* | 3/2011 | Chowdhury | H04L 12/14 |
| | | | 370/230 |
| 2011/0075675 A1* | 3/2011 | Koodli | H04L 12/14 |
| | | | 370/401 |
| 2011/0171953 A1* | 7/2011 | Faccin | H04W 48/08 |
| | | | 455/426.1 |
| 2012/0063300 A1* | 3/2012 | Sahin | H04W 36/12 |
| | | | 370/225 |
| 2012/0236871 A1* | 9/2012 | Wallace | H04L 61/10 |
| | | | 370/401 |
| 2013/0272127 A1* | 10/2013 | Ali | H04L 43/12 |
| | | | 370/235 |
| 2015/0092576 A1* | 4/2015 | Vaidya | H04L 47/11 |
| | | | 370/252 |

FOREIGN PATENT DOCUMENTS

WO    2006074826    7/2006

* cited by examiner

*Primary Examiner* — Edan Orgad
*Assistant Examiner* — Vanneilian Lalchinthang

(57) ABSTRACT

Examples disclosed herein provide systems, methods, and software to manage communication paths in a communication network. In one example, a method of operating a mobility management entity to manage communication paths includes transferring a plurality of general packet radio service tunneling protocol (GTP) messages to a plurality of packet data network gateways, and identifying one or more response messages from the plurality of packet data network gateways. The method further includes determining transaction success information for each packet data network gateway in the plurality of packet data network gateways based on the one or more response messages, and altering communication path allocation based on the transaction success information.

20 Claims, 7 Drawing Sheets

| TRANSACTION SUCCESS DATA STRUCTURE 500 |||
|---|---|---|
| PGW IDENTIFIERS 510 | RESPONSE COUNTS 520 | SUCCESS RATES 530 |
| PGW 511 | RESPONSE COUNT 521 | SUCCESS RATES 531 |
| PGW 512 | RESPONSE COUNT 522 | SUCCESS RATES 532 |
| PGW 513 | RESPONSE COUNT 523 | SUCCESS RATES 533 |
| ... | ... | ... |
| PGW 514 | RESPONSE COUNT 524 | SUCCESS RATES 534 |

FIGURE 5

IDENTIFYING AVAILABLE PACKET DATA NETWORK GATEWAYS BASED ON RESPONSE MESSAGES

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, gateways, such as packet data network gateways (PGWs) and serving gateways (SGWs) are used to manage the communications as they are delivered across the wireless network. For example, a PGW acts as the interface between the Long-Term Evolution (LTE) network and other packet data networks, such as the Internet or other session initiation protocol networks, whereas the SGW routes data packets between one or more eNodeBs and the PGW.

As more devices attempt to communicate over a network, various PGWs may experience an increase in load. This increase in load may cause poor throughput and latency to the connected end user devices. Further, although some of the PGWs may be experiencing the increase in load or unavailability in some examples, other PGWs within the same LTE network may have available capacity to handle communications from the wireless devices. Thus, some communications may be impaired despite other communication paths being available to assist the burdened or unavailable PGWs.

Overview

Examples herein provide systems methods and software to manage communication path allocation in a communication network. In one example, a method of operating a mobility management entity to manage communication paths includes transferring a plurality of general packet radio service tunneling protocol (GTP) messages to a plurality of packet data network gateways, and identifying one or more response messages from the plurality of packet data network gateways. The method further includes determining transaction success information for each packet data network gateway in the plurality of packet data network gateways based on the one or more response messages, and altering communication path allocation based on the transaction success information.

BRIEF DESCRIPTION OF THE DRAWINGS

FIG. 5 illustrates a data structure for managing communication path allocation based on response messages.

DETAILED DESCRIPTION

Figure 1:
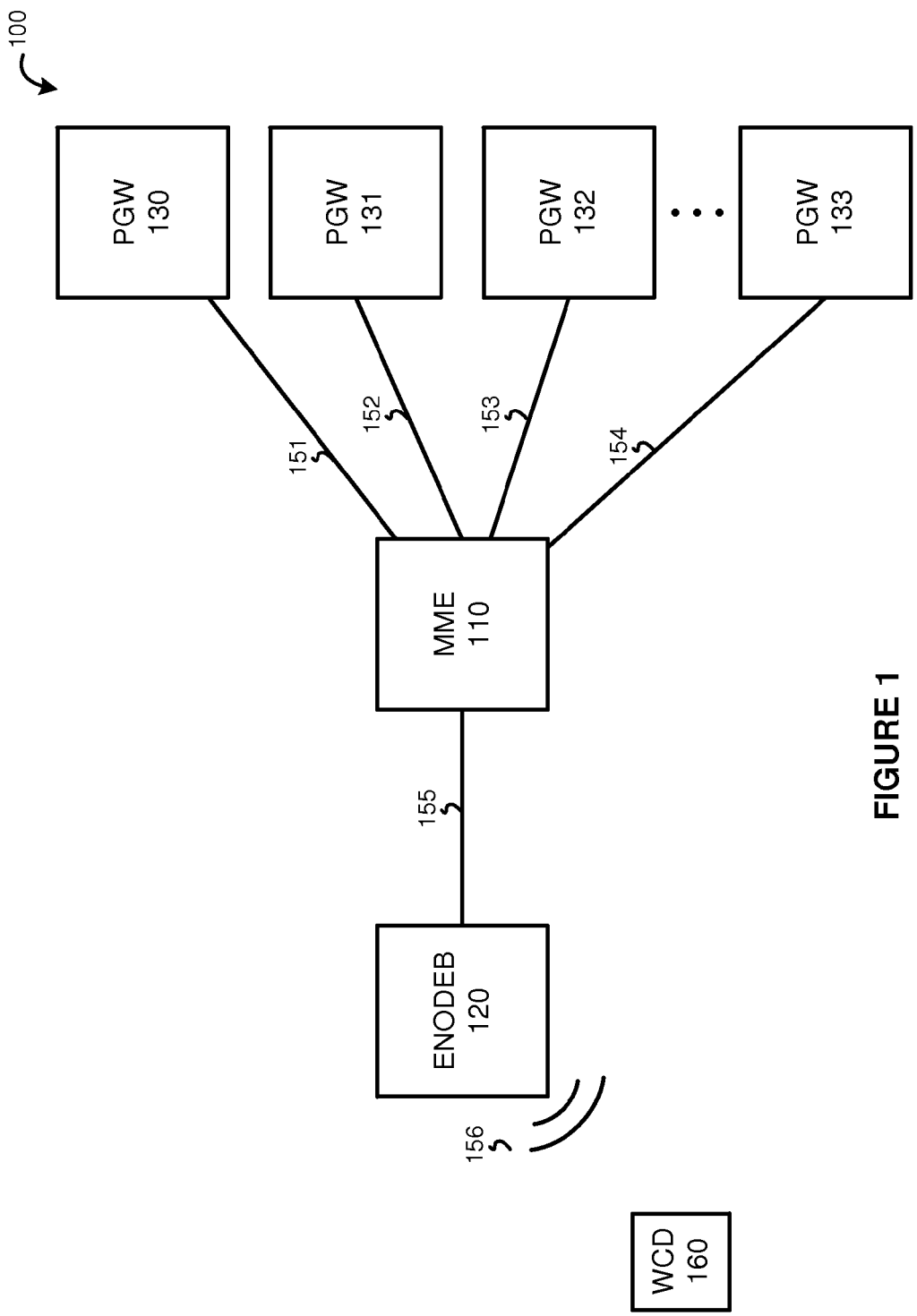
FIG. 1 illustrates a communication system to manage communication path allocation based on response messages.

FIG. 1 illustrates a communication system 100 to manage communication path allocation based on response messages. Communication system 100 includes mobility management entity (MME) 110, eNodeB 120, packet data network gateways (PGWs) 130-133, and wireless communication device (WCD) 160. MME 110 communicates with PGWs 130-133 over communication links 151-154, and further communicates with eNodeB 120 over communication link 155. ENodeB 120 communicates with WCD 160 over wireless sector 156. Although not illustrated in the present example, it should be understood that one or more serving gateways (SGWs) may exist in the communication path between eNodeB 120 and PGWs 130-133, as well as between MME 110 and PGWs 130-133.

In operation, PGWs 130-133 act as an intermediary between a Long Term Evolution (LTE) network and other data networks, such as the internet. When a WCD requires a communication, such as WCD 160, a request may be transferred from WCD 160 over eNodeB 120 to MME 110. Once received, MME 110 identifies a communication path for the communication, and initiates the communication for WCD 160 over the identified path.

Here, to identify the communication path for WCD 160, MME 110 maintains information regarding general packet radio service tunneling protocol (GTP) messages that are transferred from MME 110 to PGWs 130-133. These GTP messages are used by MME 110 for tunnel management to create sessions, end sessions, create bearers, and modify bearers for communications from various WCDs. Once PGWs 130-133 receive the GTP messages, the PGWs are configured to transfer response messages to acknowledge the receipt of the GTP messages. In some examples, such as when a PGW is overloaded or unavailable, the PGW may be incapable of receiving a GTP message from MME 110. As a result, a response message may never be delivered to MME 110 in response to the GTP message.

Upon failing to receive the response GTP message, MME 110 may manage a data structure to maintain information about successful transactions between MME 110 and the various PGWs 130-133. Accordingly, based on the data structure and the number of received response messages, MME 110 may prevent future communication path allocations to a particular PGW. For example, if PGW 130 failed to respond to GTP messages from MME 110, MME 110 may prevent or limit future communication path allocations over PGW 130.

Figure 2:
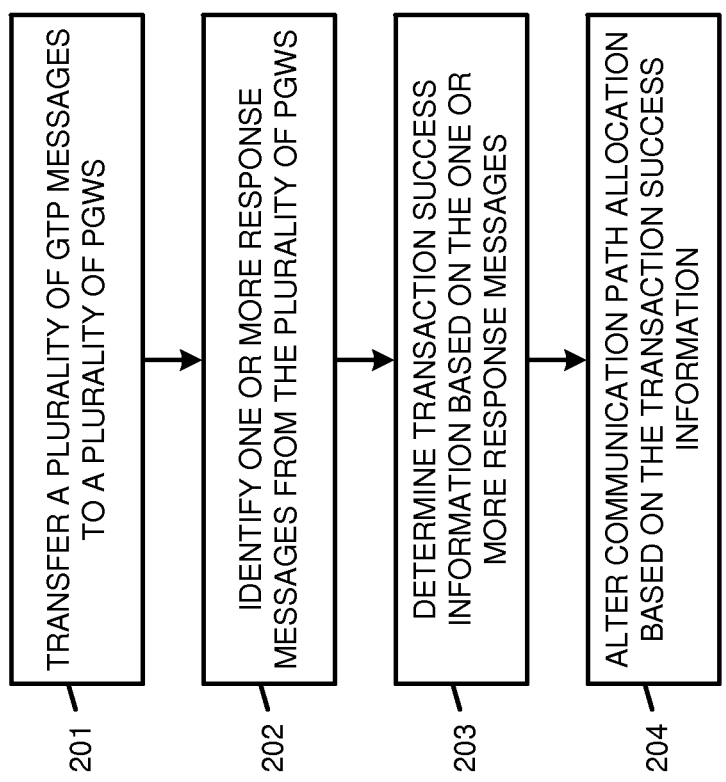
FIG. 2 illustrates a process of operating a mobility management entity to manage communication path allocation based on response messages.

FIG. 2 illustrates a process of operating MME 110 to manage communication path allocation based on response messages. As described in FIG. 1, MME 110 is a management system capable of determining communication paths and initiating communications over PGWs within a LTE network. During the communication initiations, GTP messages are transferred to PGWs 130-133 indicating session initiation and bearer creation for each of the communications (201). For example, if a WCD requested a new communication, MME 110 would identify a PGW for the communication and transfer a GTP message to the PGW to initiate allocation of a communication path. Responsive to receiving the GTP messages, PGWs 130-133 transfer response messages, which are received by MME 110, indicating acknowledgments of the GTP messages (202). In some examples, MME 110 may fail to receive a response message for each of the GTP messages transferred to PGWs 130-133. For instance, PGW 130 may be under heavy load or unavailable, and as a result be unable to respond to the GTP messages from MME 110. Due to these failed responses, MME 110 determines transaction success information for each PGW of PGWs 130-133 based on the received responses (203). Further, MME 110 alters communication path allocation based on the transaction success information for each of PGWs 130-133 (204).

In at least one example, a plurality of GTP messages is transferred to PGWs 130-133 to configure communication paths for various WCDs. As response messages are received from each of PGWs 130-133, MME 110 may determine a transaction success rate based on the number of response messages received per the number GTP messages transferred for a particular PGW. For instance, MME 110 may transfer ten GTP messages to PGW 130 in one minute, but may only receive nine response messages. Based on the success rate, in this case nine of ten, MME 110 may compare the success rate to transaction criteria to determine whether PGW 130 meets the transaction criteria. If PGW 130 meets the transaction criteria, future path allocations to PGW 130 may be limited or prevented. For example, if the transaction criteria qualified all devices with ninety-five percent or less success rate for a particular minute, PGW 130 would meet the criteria, and the distribution of new communications to PGW 130 would be modified accordingly. Thus, if WCD 160 were to require a communication during this time period, MME 110 may direct the communication to one of PGWs 131-133 to prevent routing the device through the possibly overloaded PGW 130.

In some instances, the path allocation modification may be temporary, allowing MME 110 to resume path allocations to the overloaded or unavailable PGW. For example, MME 110 may prevent allocations to PGW 130 for a predetermined period of time. However, once the predetermined period of time is expired, MME 110 may again transfer new GTP messages to PGW 130.

Figure 3:
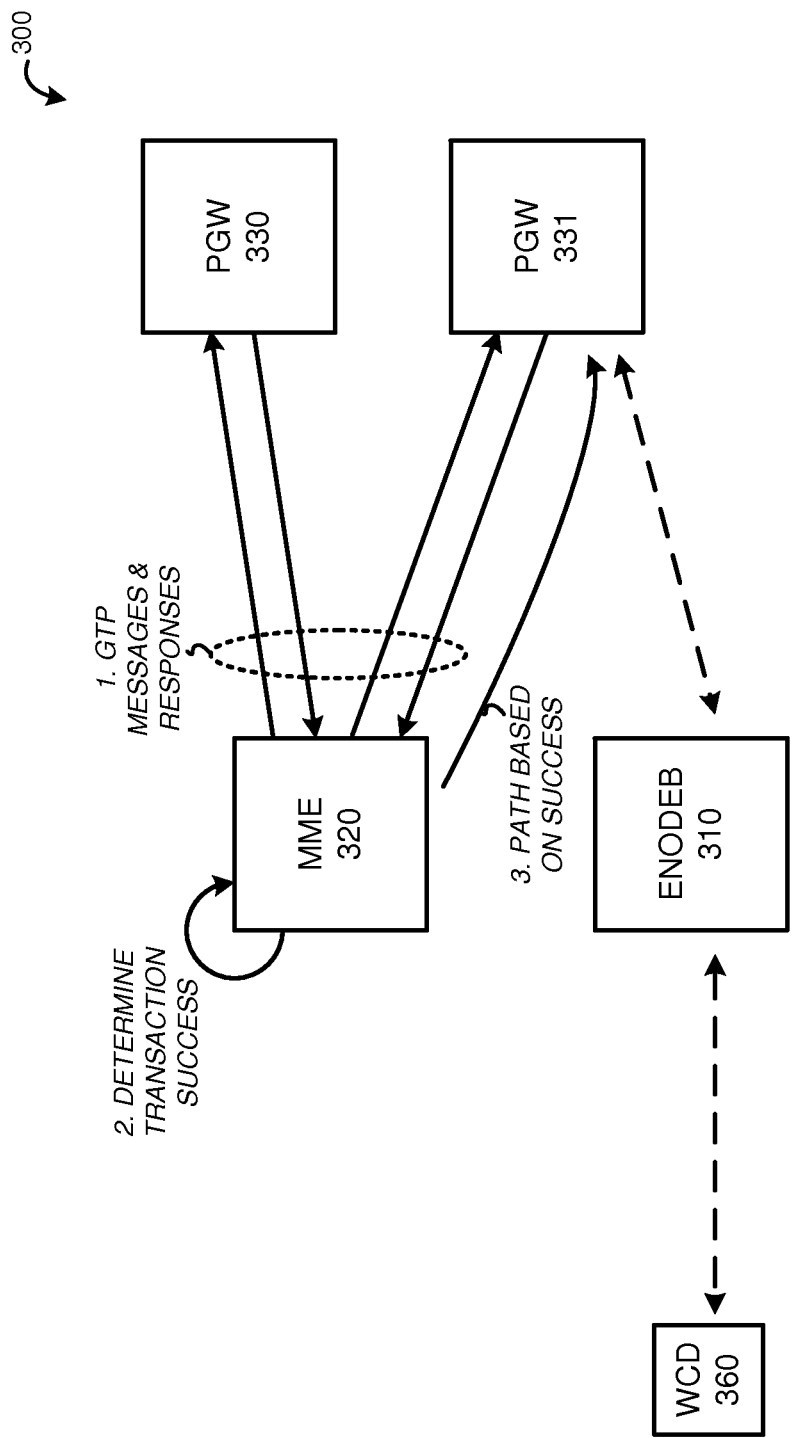
FIG. 3 illustrates an overview of operating a communication system to manage communication path allocation based on response messages.

FIG. 3 illustrates an overview 300 of operating a communication system to manage communication path allocation based on response messages. Overview 300 includes eNodeB 310, MME 320, PGWs 330-331, and WCD 360. As depicted, MME 320 transfers a plurality of GTP messages to PGWs 330-331 to configure communication paths for connecting communication devices. These GTP configuration messages allow MME 320 to create session and bearer requests for each of PGWs 330-331 and the corresponding WCDs. In response to each of the GTP messages, PGWs 330-331 are configured to transfer response messages acknowledging the receipt of the GTP message. However, if one of PGWs 330-331 is overloaded or unavailable, MME 320 may be unable to receive a response message for a particular GTP communication.

Accordingly, based on the response messages received, MME 320 may determine transaction success information for each of PGWs 330-331. This success information, in some examples, may include a transaction success rate for each of the PGWs, which is defined based on the number of response messages per the number of GTP messages for a particular PGW. Thus, if one PGW of PGWs 330-331 had a transaction success that met limiting criteria, MME 320 may prevent future communication allocations to the particular PGW.

For instance, referring to FIG. 3, WCD 360 initiates a communication over eNodeB 310. Responsive to this initiation, eNodeB 310 contacts MME 320 to determine a proper communication path for the desired communication. Here, MME 320 identifies that the success rate for PGW 330 meets a criteria limiting the number of future communication path allocations to the gateway. Accordingly, MME 320 directs the WCD communication to PGW 331 and initiates the communication over the path.

Although not illustrated in the present example for clarity, it should be understood that at least one serving gateway might reside in the path between eNodeB 310 and PGWs 330-331. Further, in some examples, the limiting of allocation to a particular PGW may only occur for a predefined period. Thus, after the period has expired, MME 320 may revert to transferring GTP messages allocating communication paths to the PGW. If it is found that the PGW again is unavailable based on the response messages, MME 320 may again alter the communication path allocation to the PGW.

Figure 4:
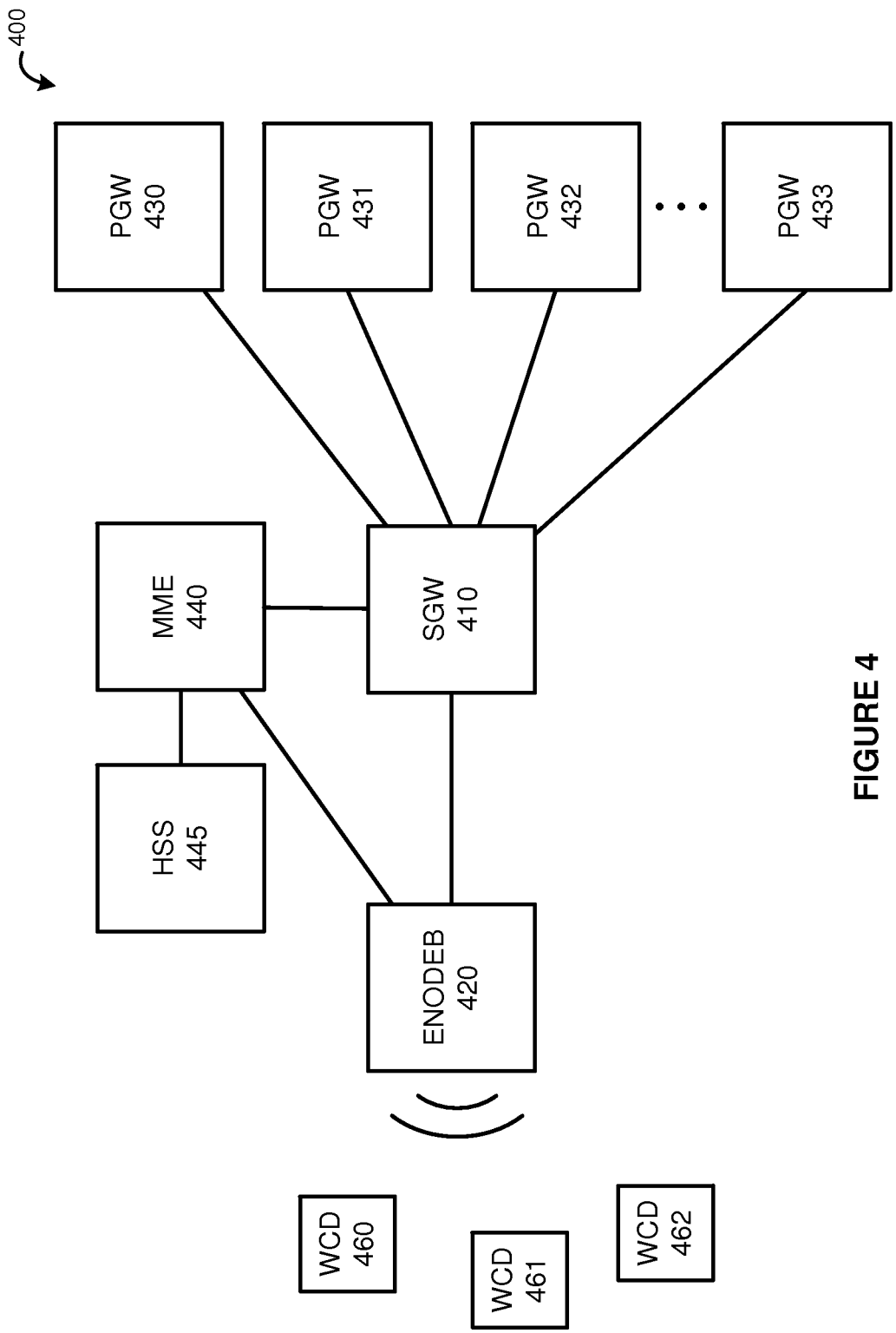
FIG. 4 illustrates a communication system to manage communication path allocation based on response messages.

FIG. 4 illustrates a communication system 400 to manage communication path allocation based on response messages. FIG. 4 includes SGW 410, eNodeB 420, PGWs 430-433, MME 440, home subscriber server (HSS) 445, and WCDs 460-462. In operation, WCDs communicate wirelessly with eNodeB 420 to provide various data to applications and processes executing on the WCDs. To provide the data communications, eNodeB 420 contacts MME 440 to determine the communication path for each of the connecting devices. Once contacted, MME 440 may contact HSS 445 to provide subscription information for the various connecting WCDs 460-462, and may also provide access point names (APNs) for each of the communication requests. In response to determining the subscriber information, MME 440 may identify a communication path for each of the communication requests from WCDs 460-462.

As described herein, the communication path allocation may be based in part on transaction success rates between MME 440 and PGWs 430-433. Thus, if one of the PGWs fails to respond to a predefined number of GTP messages, the PGW may receive a limited number of new communications. For example, if PGW 430 failed to respond to all GTP messages in a predefined period prior to the communication initiations for WCDs 460-462, MME 440 may prevent PGW 430 from being allocated to any of the communication paths. Thus, even if MME 440 performs a domain name service (DNS) operation that identifies PGW 430, MME 440 may override this selection and initiate the selection of an alternative PGW that provides access to the proper packet data network for the WCD.

In some examples, MME 440 may maintain a data structure that stores the GTP message information for each of PGWs 430-433. This data structure may comprise a table, an array, a linked list, or any other similar data structure to maintain information. This information may include the number of GTP messages delivered to each PGW over a time period, the number of response messages received from each PGW over the same time period, a transaction success value for each PGW over the time period, or any other similar related information. Once the data structure is stored, MME 440 may check the data structure to determine if a particular PGW is available to establish a communication path. If the PGW is unavailable based on the transaction success information, MME 440 may defer to an alternative PGW that is serving the same APN.

FIG. 5 illustrates a transaction success data structure 500 for managing communication path allocation based on response messages. Data structure 500 is represented as a table in the present example, however, it should be understood that transaction success information might be maintained in an array, list, or any other similar data structure. Transaction success data structure 500 includes PGW identifiers 510, response counts 520, and success rates 530, although it should be understood that data structure 500 may include other fields. PGW identifiers includes PGWs 511-514, response counts 520 includes response counts 521-524, and success rates 530 includes success rates 531-534.

As described herein, an MME may be responsible for establishing and modifying communication paths within a communication network. To establish these paths, the MME transfers GTP messages to a plurality of PGWs to establish bearers and sessions for the wireless devices. In response to each of the GTP messages, the MME waits for a response from the PGW to ensure the PGW received the appropriate GTP message. As a result, the MME may maintain a record of the number of response messages received from each PGW to assist in determining the PGWs that are unavailable. This information is maintained as response counts 520 in data structure 500.

Once the response counts are identified for each of the PGWs within the communication system, the MME may also determine success rates 530 for the GTP messages and responses. Success rates 530 comprise ratios corresponding to the number of responses received per the number of GTP messages that were delivered for each of the PGWs. Accordingly, if ten GTP messages were transferred to PGW 511, but only eight response messages were received, success rate 531 may indicate a success rate of eighty percent or any other relational form of expression. In some examples, success rates 530 may be maintained only for a recent period of time, such as the last five minutes, the last hour, or some other predetermined period of time. Accordingly, success rates 530 should reflect the current state of each of the PGWs accessible by the MME.

Upon determining success rates 530 for each of the PGWs, a new WCD may require a communication. Accordingly, based on success rates 530 stored on the MME, a communication path with a PGW may be determined for the device. For example, if success rates 530 identified that PGWs 511 and 514 were unavailable to handle a new device communication, PGW 512 or 513 may be used in their place. This may be determined based on a criteria or threshold that limits new assessments to PGWs that are overloaded or unavailable to received GTP messages. For instance, an administrator may specify that any PGW that responds to ninety percent or less of GTP messages transferred by the MME will not be used for future communications. Accordingly, when a new WCD requires a communication, the MME may prevent the communication path from going to any PGW with a success rate ninety percent or lower.

In some examples, the enforcement of the success rate criteria may be used for a predetermined period of time. Consequently, the MME may prevent new devices from being transferred to a particular PGW for the time period, but upon expiration of the time period reinitiate the transfer of GTP messages to the particular PGW. Once reinitiated, a new response count may be generated along with a new success rate for the PGW.

Figure 6:
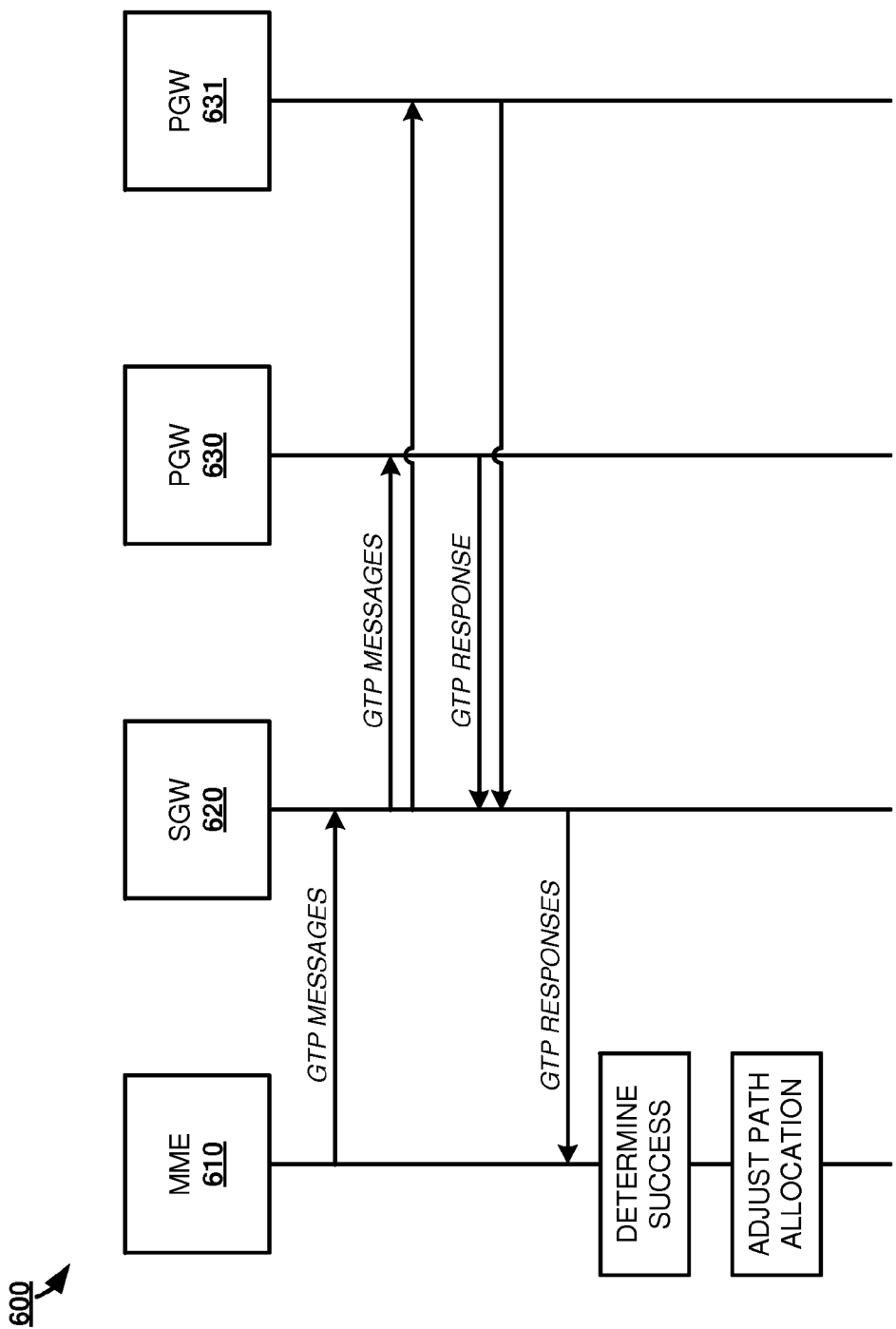
FIG. 6 illustrates a timing diagram for identifying response messages from a plurality of packet data network gateways.

FIG. 6 illustrates a timing diagram 600 for identifying response messages from a plurality of packet data network gateways. Timing diagram 600 includes MME 610, SGW 620, and PGWs 630-631. In operation, MME 610 transfers GTP messages to SGW 620 using the S11 interface. Upon receipt of the GTP messages SGW 620 forwards the messages to one of PGWs 630-631 using the S5 or S8 interface corresponding to each of the PGWs. These GTP messages allow MME 610 to create bearers and sessions for communicating WCDs, allocating a communication path between the WCDs and the packet data networks.

Once the GTP messages are transferred to PGW 630-631, MME 610 waits for a response indicating an acknowledgment that each of the GTP messages were received by a particular PGW. As illustrated in FIG. 6, each of PGWs 630-631 is configured to send a response message over SGW 620 to MME 610. However, if a PGW is unable to receive the original GTP message, a response message may never be received. Accordingly, MME 610 is configured to count the number of response messages received from each PGW, and compare the number of responses to the number of GTP messages transferred to a particular PGW. For example, MME 610 may transfer one hundred GTP messages to PGW 630, however, MME 610 may only receive eighty response messages from PGW 630. Consequently, MME 610 may determine a success rate of the number of complete transactions between MME 610 and PGW 630, which in the present example would be eighty percent.

Upon determining the success rates for each of PGWs 630-631, MME 610 may adjust path allocation to each of the PGWs for newly connecting WCDs. In some examples, an administrator may specify a criteria for which to limit the number of new connections to a WCD. This criteria may include a requisite success rate for a PGW to continue to process new communication devices. Thus, if one of PGWs 630-631 had a success rate that failed to meet the success rate required by the administrator, MME 610 may refuse to assess a new WCD connection to the particular PGW.

In some examples, MME 610 may initiate a DNS operation to select a particular PGW for a WCD communication. Once a PGW address is identified for the communication, MME 610 may compare the default PGW to the success information aggregated from each of PGWs 630-631. If the default PGW fails to meet the criteria necessary to process a new communication, MME 610 may initiate an operation to change the selected PGW. In some examples, this may include initiating a new DNS operation to identify a new PGW, however, in other examples, MME 610 may select an alternative PGW that has had an adequate GTP success rate. For example, PGW 630 may have an inadequate success rate to support new WCD communications. Thus, when a WCD requests a communication, MME 610 may reject PGW 630 as a possible gateway node, and instead redirect the communication to PGW 631.

Figure 7:
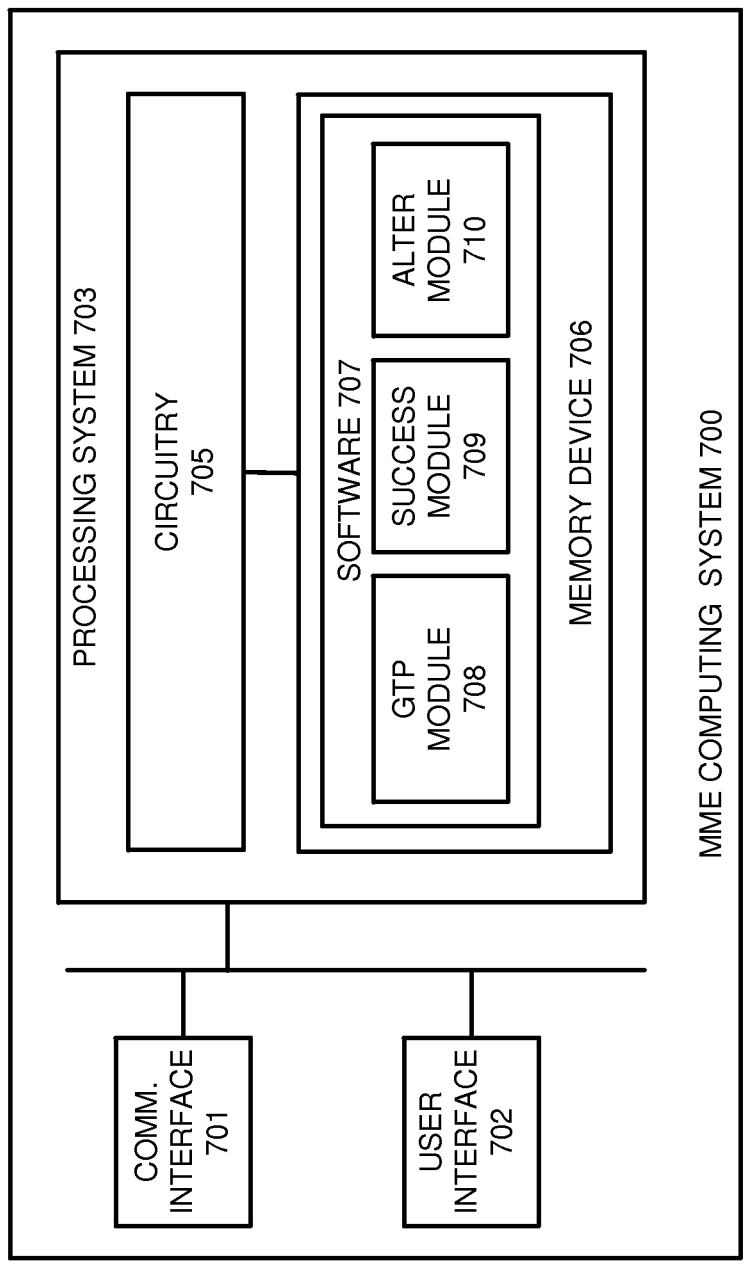
FIG. 7 illustrates a mobility management entity computing system to manage communication path allocation based on response messages.

FIG. 7 illustrates a MME computing system 700 to manage communication path allocation based on response messages. MME computing system 700 is representative of a computing system that may be employed in any computing apparatus, system, or device, or collections thereof, to suitably implement the MMEs described herein. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. In particular, communication interface 701 may interface with one or more SGW systems to transfer GTP messages to a plurality of PGWs. These GTP messages are used to configure bearers and sessions for wireless communications to packet data networks. Further, communication interface 701 may communicate with one or more base stations that provide wireless communication sectors to a plurality of WCDs.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes GTP module 708, success module 709, and alter module 710, although any number of software modules may provide the same operation. Operating software 707 may further include an operating system, utilities, drivers, network interfaces, applications, or some other type of software. When executed by circuitry 705, operating software 707 directs processing system 703 to operate MME computing system 700 as described herein.

Specifically, GTP module 708 is configured to, when executed by MME computing system 700, transfer GTP messages to a plurality of PGWs that act as an interface between the LTE network and one or more packet data networks, such as the internet. Further, GTP module 708 identifies response messages from each of the PGWs acknowledging each of the GTP messages. Although each of the PGWs ideally transfers a response for every GTP message, in some examples, a PGW may be overloaded or unavailable resulting in missed GTP messages. Accordingly, computing system 700 may manage a data structure to keep track of the number of response messages received for each of the PGWs.

As response messages are received, success module 709 may be used to determine transaction success information corresponding to the GTP interactions between computing system 700 and the PGWs. For example, success module 709 may be used to generate transaction success rates for each of the PGWs, which relates the number of response messages received to the number of GTP messages transferred. For instance, computing system may transfer ten new GTP messages to a particular PGW to initiate communications for ten different devices. However, only nine response messages may be received from the PGW. Thus, the transaction success rate is nine out of ten or any other similar percentage or expression. In some examples, the transaction success rate for each of the PGWs may be determined for recent time periods. Thus, computing system 700 may maintain information regarding the number of response messages delivered to the MME in a recent time period to accurately reflect the current state of the PGWs.

Based on the transaction success rates, alter module 710 may be used to alter future communication paths for connecting WCDs. For instance, computing system 700 may be used to identify communication paths across four different PGWs. If one of the PGWs had a transaction success rate that met criteria demonstrating that the PGW was unavailable, MME may prevent a new communication from being directed through that PGW, and redirect the communication through an alternative PGW.

In some examples, the alteration of allocating communication paths may occur for a predetermined period of time. For examples, when a PGW is identified as unsuccessful with transactions, that PGW may be avoided for an administrator-defined period of time. Upon the period of time expiring, computing system 700 may initiate transferring GTP messages and allocating new wireless communications to communicate over the troubled PGW.

Returning to the elements of FIG. 1, eNodeB 120, MME 110, and PGWs 130-133 may each include communication interfaces, network interfaces, processing systems, computer systems, microprocessors, storage systems, storage media, or some other processing devices or software systems, and can be distributed among multiple devices. In particular, eNodeB may be configured to provide LTE wireless coverage to one or more wireless communication devices. MME 110 is a control node with the LTE access network and is responsible for identifying the proper PGW and SGW for a communication with a WCD. PGWs 130-133 provide connectivity between the LTE network and various packet data networks, such as the internet or an IP multimedia subsystem (IMS).

WCD 160 may comprise a telephone, a computer, a gaming system, a tablet, or other similar wireless devices. WCD 160 may include communication interfaces, network interfaces, processing systems, computer systems, microprocessors, storage systems, storage media, or some other processing devices or software systems.

Communication links 151-155 each use metal, glass, optical, air, space, or some other material as the transport media. Communication links 151-155 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication links 151-155 may each be a direct link, or can include intermediate networks, systems, or devices, and can include a logical network link transported over multiple physical links. Wireless sector 156 is used to provide a LTE communication link between WCD 160 and eNodeB 120.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a mobility management entity (MME) to manage communication paths, the method comprising:
   transferring a plurality of general packet radio service tunneling protocol (GTP) messages to a plurality of packet data network gateways;
   identifying one or more response messages from the plurality of packet data network gateways;

determining transaction success information for each packet data network gateway in the plurality of packet data network gateways based on the one or more response messages, wherein the transaction success information comprises a transaction success rate;

identifying when a first transaction success rate for a first packet data network gateway meets transaction criteria; and when the first transaction success rate meets the transaction criteria, altering communication path allocation to the first packet data network gateway based on the transaction success information.

2. The method of claim 1 wherein the transaction success rate for each packet data network gateway in the plurality of packet data network gateways comprises a ratio of the one or more response messages identified from the packet data network gateway in relation to the GTP messages transferred to the packet data network gateway.

3. The method of claim 2 wherein the plurality of GTP messages are transferred and the one or more response messages are identified over a defined time period.

4. The method of claim 1 wherein altering the path allocation to the first packet data network gateway comprises preventing new path allocations to the first packet data network gateway.

5. The method of claim 1 wherein altering the path allocation to the first packet data network gateway comprises limiting a number of new path allocations to the first packet data network gateway.

6. The method of claim 1 wherein altering the path allocation to the first packet data network gateway comprises altering the path allocation to the first packet data network gateway for a predefined period.

7. The method of claim 1 wherein the transaction criteria comprise administrator defined criteria.

8. A computer apparatus to manage communication paths, the computer apparatus comprising:

processing instructions that direct a mobility management entity (MME) computing system, when executed by the MME computing system, to:

transfer a plurality of general packet radio service tunneling protocol (GTP) messages to a plurality of packet data network gateways;

identify one or more response messages from the plurality of packet data network gateways;

determine transaction success information for each packet data network gateway in the plurality of packet data network gateways based on the one or more response messages, wherein the transaction success information comprises a transaction success rate;

identify when a first transaction success rate for a first packet data network gateway meets transaction criteria; and when the first transaction success rate meets the transaction criteria, alter communication path allocation to the first packet data network gateway based on the transaction success information; and one or more non-transitory computer readable media that store the processing instructions.

9. The computer apparatus of claim 8 wherein the transaction success rate for each packet data network gateway in the plurality of packet data network gateways comprises a ratio of the one or more response messages identified from the packet data network gateway in relation to the GTP messages transferred to the packet data network gateway.

10. The computer apparatus of claim 9 wherein the plurality of GTP messages are transferred and the one or more response messages are identified over a defined time period.

11. The computer apparatus of claim 8 wherein the processing instructions to alter the path allocation to the first packet data network gateway direct the MME computing system to prevent new path allocations to the first packet data network gateway.

12. The computer apparatus of claim 8 wherein the processing instructions to alter the path allocation to the first packet data network gateway direct the MME computing system to limit a number of new path allocations to the first packet data network gateway.

13. The computer apparatus of claim 8 wherein the processing instructions to alter the path allocation to the first packet data network gateway direct the MME computing system to alter the path allocation to the first packet data network gateway for a predefined period.

14. The computer apparatus of claim 8 wherein the transaction criteria comprise administrator defined criteria.

15. A communication system to manage communication paths for wireless communication devices, the communication system comprising:

a plurality of packet data network gateways;

a mobility management entity (MME) configured to:

transfer a plurality of general packet radio service tunneling protocol (GTP) messages for delivery to each of the plurality of packet data network gateways;

the plurality of packet data network gateways each configured to:

for each GTP message of the plurality GTP messages that is received, transfer a response message for delivery to the MME; and the MME configured to:

receive one or more response messages from the plurality of packet data network gateways;

determine transaction success information for each packet data network gateway in the plurality of packet data network gateways based on the one or more response messages, wherein the transaction success information comprises a transaction success rate;

identify when a first transaction success rate for a first packet data network gateway meets transaction criteria; and when the first transaction success rate meets the transaction criteria, alter communication path allocation to the first packet data network gateway based on the transaction success information.

16. The communication system of claim 15 wherein the transaction success rate for each packet data network gateway in the plurality of packet data network gateways comprises a ratio of the one or more response messages identified from the packet data network gateway in relation to the GTP messages transferred to the packet data network gateway.

17. The communication system of claim 16 wherein the plurality of GTP messages are transferred and the one or more response messages are received over a defined time period.

18. The communication system of claim 15 wherein the MME configured to alter the path allocation to the first packet data network gateway is configured to prevent new path allocations to the first packet data network gateway.

19. The communication system of claim 15 wherein the MME configured to alter the path allocation to the first packet data network gateway is configured to limit a number of new path allocations to the first packet data network gateway.

20. The communication system of claim 15 wherein the transaction criteria comprise administrator defined criteria.

* * * * *